US012567298B2

(12) United States Patent
Wallman-Carlsson et al.

(10) Patent No.: US 12,567,298 B2
(45) Date of Patent: Mar. 3, 2026

(54) COIN FEEDING UNIT, A MODULE COMPRISING SAID COIN FEEDING UNIT, AND A COIN HANDLING MACHINE

(71) Applicant: SCAN COIN AB, Malmö (SE)

(72) Inventors: Victor Wallman-Carlsson, Malmö (SE); Håkan Melin, Åkarp (SE); Kristian Bengtsson, Bjärred (SE); Dan Wigenstam, Eslöv (SE)

(73) Assignee: SCAN COIN AB, Malmö (SE)

( * ) Notice: Subject to any disclaimer, the term of this patent is extended or adjusted under 35 U.S.C. 154(b) by 818 days.

(21) Appl. No.: 17/622,940

(22) PCT Filed: Jun. 26, 2020

(86) PCT No.: PCT/EP2020/068089
§ 371 (c)(1),
(2) Date: Dec. 27, 2021

(87) PCT Pub. No.: WO2020/260627
PCT Pub. Date: Dec. 30, 2020

(65) Prior Publication Data

US 2022/0292904 A1 Sep. 15, 2022

(30) Foreign Application Priority Data

Jun. 28, 2019 (SE) .................................... 1950807-6

(51) Int. Cl.
*G07D 9/00* (2006.01)
*G07D 3/00* (2006.01)
*G07F 1/04* (2006.01)

(52) U.S. Cl.
CPC ............... *G07D 9/008* (2013.01); *G07D 3/00* (2013.01); *G07F 1/04* (2013.01); *G07D 2201/00* (2013.01)

(58) Field of Classification Search
CPC .... G07F 1/00; G07F 1/02; G07F 1/04; G07D 3/00; G07D 3/128; G07D 9/008
(Continued)

(56) References Cited

U.S. PATENT DOCUMENTS 3,422,824 A 1/1969 Persson
4,383,540 A * 5/1983 De Meyer ................ G07D 3/00 453/32

(Continued)

FOREIGN PATENT DOCUMENTS

EP 0345868 B1 8/1993
EP 0996100 B1 12/2009

(Continued)

OTHER PUBLICATIONS

International Search Report for PCT/EP2020/068089, prepared by the European Patent Office, Mailing date Sep. 18, 2020, 3 pages.

*Primary Examiner* — Jeffrey A Shapiro
(74) *Attorney, Agent, or Firm* — Brooks Kushman P.C.

(57) ABSTRACT

The disclosure relates to a coin feeding unit for a coin handling machine, the coin feeding unit comprising: a coin guiding arrangement, and a coin transport arrangement defining a movable transport surface, wherein said coin guiding arrangement is configured to receive coins and to guide said received coins to an inner coin arrival surface of the coin guiding arrangement, wherein the coin transport arrangement is configured to move said coins, on the movable transport surface, from the coin arrival surface to a coin output position, wherein a discharge gate is provided in the coin guiding arrangement, at the coin arrival surface, for discharging unwanted objects residing thereon, wherein the discharge gate is slidably arranged in the coin guiding arrangement so as to be displaceable, between a closed position and an open position.

15 Claims, 9 Drawing Sheets

(58) Field of Classification Search
USPC ......... 194/351; 453/6, 12, 13, 49, 57, 33–35
See application file for complete search history.

(56) References Cited

U.S. PATENT DOCUMENTS

| | | | | |
|---|---|---|---|---|
| 4,752,274 | A | 6/1988 | Abe | |
| 6,200,213 | B1 * | 3/2001 | Cole | G07D 9/008 453/18 |
| 6,823,977 | B2 * | 11/2004 | Abe | G07D 9/008 194/351 |
| 7,244,177 | B2 * | 7/2007 | Abe | G07D 9/008 453/18 |
| 7,455,579 | B2 * | 11/2008 | Takeuchi | G07D 9/008 453/18 |
| 11,238,687 | B2 * | 2/2022 | Dano | G07D 9/008 |
| 2001/0015310 | A1 * | 8/2001 | Cole | G07D 9/008 453/18 |
| 2004/0176020 | A1 * | 9/2004 | Abe | G07D 9/008 453/49 |
| 2006/0040604 | A1 * | 2/2006 | Wei | G07D 9/008 453/34 |
| 2007/0108267 | A1 * | 5/2007 | Jonsson | G07D 9/008 235/379 |
| 2008/0039004 | A1 * | 2/2008 | String | G07D 9/008 453/57 |
| 2008/0299886 | A1 | 12/2008 | Enomoto | |
| 2009/0307978 | A1 * | 12/2009 | Jeffrey | E06B 7/096 49/82.1 |
| 2010/0062700 | A1 | 3/2010 | Nakazumi et al. | |
| 2011/0186622 | A1 * | 8/2011 | Nikon | G07F 9/06 232/15 |
| 2016/0123060 | A1 * | 5/2016 | Choi | E05C 19/02 49/254 |

FOREIGN PATENT DOCUMENTS

| | | | |
|---|---|---|---|
| EP | 2463829 | A1 | 6/2012 |
| EP | 3407313 | A1 | 11/2018 |
| JP | 5308449 | B2 | 10/2013 |
| JP | 6056586 | B2 | 1/2017 |

* cited by examiner

COIN FEEDING UNIT, A MODULE COMPRISING SAID COIN FEEDING UNIT, AND A COIN HANDLING MACHINE

CROSS-REFERENCE TO RELATED APPLICATION

This application is the U.S. national phase of PCT Application No. PCT/EP2020/068089 filed on Jun. 26, 2020, which claims priority to SE Patent Application No. 1950807-6 filed on Jun. 28, 2019, the disclosures of which are incorporated in their entirety by reference herein.

FIELD OF THE INVENTION

The present invention generally relates to coin feeding units for use in coin handling machines, and more specifically, the disclosure relates to a coin feeding unit for feeding a mass of coins to an output position at which individual coins of said mass of coins exit the coin feeding unit one by one.

BACKGROUND ART

Coin feeding units are well known in the art. Typically, coin feeding units are provided as one of several units working together within a coin handling machine, such as e.g. a coin depositing and dispensing machine typically provided at banks or large financial institutions. Coin feeding units may also be provided in smaller coin handling machines such as e.g. coin sorting machines. One specific kind of coin feeding unit is capable of receiving a mass of coins at essentially the same time, and feed individual coins of said mass of coins, one by one, to an output position of the coin feeding unit, at which the coins are allowed to leave the coin feeding unit. The mass of coins is typically deposited into the coin handling machine via a coin input unit provided in a face of the machine, whereby the mass of coins is transported, or guided, to the coin feeding unit all at essentially the same time. Thus, the mass of coins ends up in the coin feeding unit in an unordered fashion defining a disarray of coins. Such coin feeding units typically comprises a transport unit configured to pick up coins from the disarray of coins, and transport them, one by one, to the output position. The disarray of coins is temporarily stored in the coin feeding unit such that the coins of the disarray of coins may come into contact with the coin transport unit. Typically, the coins are temporarily stored in a coin guiding unit, such as a coin hopper.

A problem with this particular kind of coin feeding machine is that a user, when depositing the mass of coins in the coin input hopper of the machine, sometimes manages to deposit also unwanted objects such as buttons, rings, stones or the like. The unwanted objects will end up in the temporary storage together with the mass of coins but, contrary to the coins, the unwanted objects will not leave the coin hopper by the coin transport unit, as said unit is incapable of picking up the unwanted objects due to their geometrical shape.

In an attempt to solve this particular problem, coin feeding units have been developed which provides a discharge gate in the coin hopper. Said discharge gate is configured to open at time to time so as to allow the unwanted objects to leave the coin hopper. A problem with these kind of coin feeding units is, however, that unwanted objects, and coins, sometimes get stuck in, or jams the discharge gate such that it is only partially closed, risking to damage the discharge gate and/or its opening mechanism. There is thus a need in the art for an improved coin feeding unit having a discharge functionality for unwanted objects, wherein the coin feeding unit is less susceptible to jamming and/or blocking as well as more robust and durable.

SUMMARY

It is an object to mitigate, alleviate or eliminate one or more of the above-identified deficiencies in the art and disadvantages singly or in any combination and solve at least the above mentioned problem.

According to a first aspect there is provided a coin feeding unit for feeding a mass of coins to an output position at which individual coins of said mass of coins exit the coin feeding unit one by one, the coin feeding unit comprising:

a coin guiding arrangement, and a coin transport arrangement defining a movable transport surface, wherein said coin guiding arrangement is configured to receive coins and to guide said received coins, by means of gravity, to an inner coin arrival surface of the coin guiding arrangement, said coin arrival surface connecting to the coin transport arrangement and being structured and arranged such that the coins guided to the coin arrival surface will contact the movable transport surface, wherein the coin transport arrangement is configured to move said coins, on the movable transport surface, from the coin arrival surface to a coin output position for allowing said coins being output from the coin feeding unit, wherein a discharge gate is provided in the coin guiding arrangement, at the coin arrival surface, for discharging unwanted objects residing thereon, wherein the discharge gate is slidably arranged in the coin guiding arrangement so as to be displaceable, between a closed position and an open position.

By the term "coin feeding unit" is here meant any unit and/or device arranged for receiving a mass of coins, and for transporting said coins, one by one, from the location at which the received mass of coins is held, to an output position. The "coin feeding unit" is able to pick up coins from a disarray of coins, and feed them as a singular line of coins through the output position of the "coin feeding unit". By way of non-limiting examples, the "coin feeding unit" may be a part of a larger machine, such as a coin handling machine. The "coin feeding unit" may alternatively be a separate module that can be integrated into a coin handling machine or other machines, or the "coin feeding unit" may be part of such a module.

By the term "coin guiding arrangement" is here meant any unit, device and/or element arranged to guide received coins to a location at which the coins are to be held. The "coin guiding arrangement" is arranged to form a bowl at which the guided coins are held, at least in combination with the movable transport surface. A "coin guiding arrangement" may be, but is not limited to a bowl, funnel, conduit, hopper, or tube. The guiding may be achieved in combination with gravity. By the term "coin transport arrangement" is here meant any unit, device and/or element arranged to pick up coins, one by one, from a disarray of coins, and transport them to an output position. By way of a non-limiting example, this can be achieved by a rotating disc onto the surface of which a number of pickup members are provided for picking up coins. Another non-limiting example on how this can be achieved, is by the use of a conveyor belt onto the surface of which a number of pickup members are provided for picking up coins.

By the term "movable transport surface" is here meant a moving surface of the coin transport arrangement that engages with the deposited coins, for example by picking them up by means of pickup members, and moves them along with the movement of the transport surface. In the case the coin transport arrangement is a rotating disc, the "movable transport surface" may be one of the surfaces of the rotating disc. In case the coin transport arrangement is a conveyor belt, the "movable transport surface" is a moving surface on the conveyor belt.

By the term "coin arrival surface" is here meant an inner surface of the coin guiding arrangement at which the coins arrive and are held, and where the coins come in contact with the movable transport surface. This implies that the coin arrival surface defines an end position in the coin guiding arrangement for the coins being received thereto.

By the term "output position" is here meant the position at which the picked up coins will be dispensed from the movable transport surface. This may result in the coins directly leaving the coin feeding unit. It may alternatively result in further transportation, or guiding, of the coin within the coin feeding unit. By way of example, this may be where the coins on the movable transport surface engage a coin separating knife. The coin separation knife is arranged to separate coins to be output, and guide said coins out from the coin feeding unit. It is conceivable that the coin feeding unit includes output means, such as a coin output chute, or a coin transportation rail for providing said further transportation, or guiding, of the coin out from the coin feeding unit.

By the term "discharge gate" is here meant any openable and closable door, hatch or gate used for discharging unwanted objects from the coin guiding arrangement. Thus, the term implies that the discharge gate, at the closed position thereof, covers a through-opening in a wall of the coin guiding arrangement, and, at the open position thereof, uncovers the through-opening for allowing discharging the unwanted objects.

By the term "slidably arranged" is here meant arrangement for movement along a substantially smooth surface while maintaining contact with the surface. By way of example, this may be achieved by guiding the discharge gate by means of rails or grooves, between the open and closed positions. The discharge gate may slide while being in direct contact with a surface of the coin guiding arrangement, or there may, for example, be other parts in between the gate and the surface, as for example wheels.

The coin feeding unit of the present disclosure may present several advantages. In the manner described above, the discharge gate of the coin feeding unit may be less prone to having coins or unwanted objects getting stuck between the gate and the opening in the coin guiding arrangement, when attempting to close the discharge gate. Furthermore, with a hinged gate, there is a risk that the gate is accidentally being pushed open by the weight of the coins in the coin guiding arrangement. With the present discharge gate being slidably arranged, the gate is not allowed to move in the direction of the force exerted by the coin mass onto the gate, eliminating the risk of the gate being opened accidentally. By the present arrangement, a coin feeding unit with a discharge gate may be provided, wherein the discharge gate exhibits a lower risk of jamming and wherein the risk of accidentally opening the discharge gate by the weight of the material in the coin guiding arrangement, pushing the gate downwards, is eliminated, or at least reduced. Furthermore, a slidably arranged discharge gate can be made larger than a hinged gate without sacrificing functionality and/or structural integrity. This allows for a faster and more efficient discharge of unwanted objects from the coin guiding arrangement. The slidably arranged discharge gate may also be made more durable and strong than the hinged gate. Thus, the slidably arranged discharge gate may withstand higher impact and pressure from unwanted objects and coins than the hinged gate. This may be especially important in the occasion of a gate jam, where forces exerted on the discharge gate and/or transmission mechanics can be high and potentially damaging.

According to some embodiments, the coin guiding arrangement comprises a coin hopper, and wherein the discharge gate is provided in said coin hopper. The coin hopper may be shaped as a semi-bowl. The coin hopper may be attached to the coin transport arrangement, or to a supporting structure of the coin transport arrangement. The coin hopper and the transport surface of the coin transport arrangement may, together, form a bowl for holding coins received in the coin hopper. This implies that the coin arrival surface is defined at a lower portion of an inner surface of the coin hopper. Thus, the discharge gate is preferably disposed at a lower portion of an inner surface of the coin hopper.

By the term "coin hopper" is here meant any coin receiving element, or arrangement, which, together with the transport surface, forms a bowl for holding received coins.

It is further noted that a coin guiding arrangement may define a coin hopper-like lower part. Such embodiments of a coin guiding arrangement could thus be described as a combination of a first coin inlet guiding part (provided e.g. by tubing) and a second coin holding part in the form of a coin hopper. The first and second parts may be isolated from each other, but may, alternatively be attached to each other, or even integrally formed with each other.

According to some embodiments, the transport surface is an inclined surface.

An advantage with this embodiment is that gravity helps keeping the coins steadily onto the transport surface during the movement of the coins.

According to some embodiments, the coin transport arrangement comprises a rotatable disc which defines said movable transport surface.

The rotatable disc may be made of, but is not limited to, a flexible material such as rubber. The rotatable disc may comprise a number of pickup members, in order to more easily pick up coins, one by one, during the rotation of the disc. The rotatable disc may be structured and arranged such that its transport surface is substantially planar. However, it is also conceivable that the rotatable disc is structured and arranged such that its transport surface is curvilinear. This may be achieved e.g. by providing a rotatable disc which is flexible. Such a flexible rotatable disc may be arranged to rotate onto a curvilinear stationary surface, whereby the flexible rotating disc will reshape itself during rotation to define the curvilinear shape of the underlying stationary surface.

According to some embodiments, the discharge gate is displaceable along a displacement path defined substantially along the coin arrival surface of the coin guiding arrangement.

By the term "along the coin arrival surface" is meant that the discharge gate is moved substantially parallel to an extension of the coin arrival surface, though not necessarily being in physical contact with the coin arrival surface. The discharge gate may follow a displacement path on the inside of the coin guiding arrangement where the coin arrival surface is located. The discharge gate may, alternatively, follow a displacement path on the outside of the coin guiding arrangement. A third alternative may be that the discharge gate follows a displacement path in between the inner and the outer surfaces of the coin guiding arrangement.

The discharge gate may, alternatively, be displaceable along a displacement path forming an oblique angle with the coin arrival surface of the coin guiding arrangement. The displacement path may extend linearly, or substantially linearly. However, it is also conceivable that the displacement path extends nonlinearly. For example, the displacement path may extend nonlinearly so as to define a circular arc. This may be appropriate e.g. for embodiments where the arrival surface is cylinder-shaped.

According to some embodiments, the discharge gate is slidably arranged in the coin guiding arrangement in a pair of opposed elongated grooves.

By the term "groove" is here meant a recess along a path in which the discharge gate can slide. The opposed elongated "grooves" may be defined in a wall portion of the coin guiding arrangement. The opposed elongated "grooves" may alternatively be defined in parts separate from the wall of the coin guiding arrangement, wherein said parts are arranged on the coin guiding arrangement. When the discharge date is sliding from the closed position to the open position, or vice versa, the discharge gate is guided by the grooves to follow the displacement path. The discharge gate is preferably to be rigid. However, it is conceivable that the discharge gate is flexible. Providing a flexible discharge gate may be beneficial for some coin feeding units, as such a flexible gate may easier follow a nonlinear displacement path.

According to some embodiments, the coin feeding unit further comprises a drive unit configured to provide kinetic energy to the discharge gate for displacing the discharge gate between the closed position and the open position.

In the present arrangement the drive unit may be any type of drive unit. By way of example, the drive unit may be, but is not limited to, an electric motor, a pneumatic actuator, a hydraulic actuator, or any other drive unit suitable for providing kinetic energy for displacing the discharge gate.

An advantage with the present embodiment is that opening and closing of the discharge date does not require manpower, and therefore the opening and closing of the discharge gate can consequently be automated.

According to some embodiments, the drive unit is an electric motor.

By the present arrangement a simple and reliable implementation of a drive unit may be provided. The use of an electric motor may have certain advantages. For example, electric motors are less expensive, has faster response, and takes up less space. Also, as compared to actuators, electric motors may have less energy consumption.

According to some embodiments, the coin feeding unit further comprises a transmission mechanism configured to transfer said kinetic energy from the drive unit to the discharge gate, wherein the transmission mechanism comprises:

a first element arranged to swing around a first pivot axis in response to being supplied with kinetic energy from the drive unit, said first element presenting a second pivot axis radially distanced from the first pivot axis, and a second element pivotally connecting said first element at said second pivot axis with said discharge gate at a third pivot axis thereof.

According to some embodiments, the first element is engaged by an engagement element which is attached to a rotational drive shaft of the electric motor. The engagement element may be attached directly or indirectly to the rotational drive shaft. Indirect attachment may alternatively mean that there may be one or more components in between the engagement element and the rotational drive shaft. Indirect attachment may alternatively mean that the engagement element is a part of a larger component which is attached to the rotational drive shaft. The engagement element may be asymmetrically attached to the rotational drive shaft such that the engagement element defines a swinging movement when rotated. The engagement element essentially operates as a crank. However, it is also conceivable that the engagement element is axisymmetric and symmetrically attached to the rotational drive shaft. One such engagement element is a cog wheel, or a pulley.

According to some embodiments, the coin feeding unit may further comprise a sensor system for detecting positions of the engagement element and the first element, respectively.

The position of the electric motor may be determined using two sensors, and a sensor blocking element arranged to block a signal to one of the sensors when the electric motor is in the closed position and blocking a signal to the other sensor when the electric motor is in the open position.

The position of the discharge gate may be determined using another two sensors; and a sensor blocking element arranged to block a signal to one of the sensors when the discharge gate is in the closed position and blocking a signal to the other sensor when the discharge gate is in the open position.

Said sensors may be e.g. fork sensors comprising a transmitting part and a receiving part which forms a gap in between one another.

The present arrangement has the advantage that, if the electric motor returns to the closed position, but the discharge gate is prevented from closing, e.g. by a jam from foreign objects and/or coins, the jam can be detected.

According to some embodiments, the transmission mechanism is configured such that, during a displacement of the discharge gate from the open position to the closed position along a closing direction of the displacement path, the discharge gate passes a maximum displacement position being distanced from the closed position in the closing direction.

Thus, when the discharge gate is closing, it moves in the closing direction away from the open position, reaches the maximum displacement position, after which the discharge gate starts to move in the opposite direction, back towards the open position. During this closing procedure, the first element and the second element are in motion such that the second pivot axis, at which the two elements are connected, is displaced in a circular motion around the first pivot axis. When the first element and the second element form a straight line, i.e. when the transmission mechanism is fully extended, the discharge gate reaches the maximum displacement position. The motion continues until either the first element or the second element around the second pivot axis, comes to a physical stop as a result of meeting e.g. a part of the coin guiding arrangement. The motion is then stopped and the discharge gate has reached the closed position.

An advantage with the present arrangement is that it provides a lock function. In the closed position, if a force were applied on the discharge door attempting to push it towards the open position, the first and second elements will be pushed towards the outer wall of the coin guiding arrangement, resulting in a counter force preventing the discharge gate from opening.

According to some embodiments, the transmission mechanism is biased such that the discharge gate is biased towards the closed position. This implies that the drive unit does not have to supply kinetic energy to the discharge gate for closing the discharge gate. This is instead achieved by the biasing of the transmission mechanism. The biasing may be advantageous as it allows for a simplified opening and closing mechanism. It may have a further advantage of preventing damage to the drive unit at occasions where an object is jamming the discharge gate during a closing of the discharge gate. For alternative embodiments of the coin feeding unit, wherein the drive unit is configured to actively close the discharge gate, the drive unit may, in case of a jam in the discharge gate, be stalled, which could risk damaging the drive unit and/or the transmission mechanism. The biasing also provides a closing functionality which does not depend on the drive unit. Hence, in case of a power loss, or in situations where power to the drive unit is deliberately broken, e.g. due to servicing or the like, the discharge gate will automatically be returned to the closed position by means of the biasing of the transmission mechanism. Further advantages with the present arrangement is that the biasing further improves the lock function of the transmission mechanism. The biasing forces the first and the second elements, and thus the discharge gate, back to the closed position such that the first or second element around the second pivot axis is always in contact with the surface of the coin guiding arrangement. The bias prevents the elements from sliding out of this position either accidentally of due to machine vibrations. By the present arrangement a discharge gate may be provided, that is securely closed and may only be opened by activation of the drive unit.

A transmission mechanism that is biased towards the closed position may be accomplished by, but is not limited to, a spring, such as e.g. a torsion spring, arranged in the transmission mechanism.

According to some embodiments, the discharge gate has a lateral extension which is defined transverse to the displacement path, and wherein the drive unit is configured to provide kinetic energy to the discharge gate by applying a force along the lateral end such that said force is symmetrically distributed along, and covers at least 50% of, the lateral extension.

By the present arrangement the force pulling the discharge gate is more evenly distributed across the width of the discharge gate. This prevents the discharge gate from being jammed during displacement of the discharge gate. Specifically, this may be of importance in embodiments where the discharge gate is slidably arranged in the coin guiding arrangement in a pair of opposed elongated grooves.

The symmetrically distributed forces may comprise individual force components applied at associated two or more points which are evenly distributed along the lateral extension. According to some embodiments, the drive unit is configured to provide kinetic energy to the discharge gate by applying two force components on the discharge gate along the lateral extension thereof, such that said two force components are distanced from each other by at least 50% of the lateral extension, and symmetrically distributed along the lateral extension.

According to some embodiments, the coin feeding unit may further comprise a collection tray configured to receive unwanted objects being discharged from the coin guiding arrangement when the discharge gate is moved from the closed position to the open position.

According to a second aspect there is provided a coin handling module for use in a coin handling machine, said coin handling module comprising: a coin feeding unit according to the first aspect,

- a coin discriminating unit configured to detect coins received from the coin feeding unit, and, dependent on the result of said detection, output detected coins in one from at least two different output paths, and
- a coin transport arrangement arranged to receive coins output from the coin feeding unit at the coin output position, and transport said coins to the coin discriminating unit.

The coin handling module of the second aspect should be construed as a separate module, which typically is replaceable. Thus, the coin handling module could be provided to customers having coin handling machines configured to receive the coin handling modules. By installing the coin handling module inside the customers coin handling machine, the coin feeding functionality may be added to the further functionality of the coin handling machine.

It is also conceivable that coin handing modules of the disclosure includes less features than the coin handling module of the first aspect. For example, a coin handling module may be provided which comprises a coin feeding unit only. Such a coin handling module, i.e. a coin feeding module, may be provided to customers having a need of a coin feeding functionality only.

According to some embodiments, the coin transport arrangement may comprise a coin transport rail. A coin separation knife may be disposed at the coin output position for guiding coins arriving to the coin output position on the transport surface such that the coins leave the transport surface and instead enters the transport rail. The coin separation knife may be a part of the transport rail. Alternatively, the coin separation knife may constitute a separate part of the coin feeding unit. The transport rail may transport coins from the output position of the coin feeding unit, to other parts of the module or to an output of the module.

The discriminating unit may be configured to distinguish between acceptable coins and unacceptable coins or other unwanted matter, such as tokens or plastic parts which due to their geometrical constraints were fed thereto by the coin feeding unit. Thus, the coin distinguishing unit may guide the matter differently depending on the result. The coin discriminating unit may comprise a sensor configured to detect characteristics of the objects passing through an active area monitored by the sensor. The coin discriminating unit may further comprise an eject functionality, realised by for example a mechanical diverter, or an actuator means for guiding unwanted matter, such as unacceptable coins and other unwanted objects, to a separate output path different from the output path along which the accepted coins will be guided. Unacceptable coins may be, but is not limited to, coins of a foreign currency or fake (counterfeit) coins.

According to some embodiments, the coin handling module may comprise further functionality, such as e.g. coin sorting functionality. Such coin handling units may for the purpose comprise a coin sorting unit configured to receive coins from the coin accepted by the coin discriminating unit and sort said coins into a plurality of coin groups, for example defined by coin denominations.

According to a third aspect there is provided a coin handing machine comprising a feeding unit according to the first aspect.

The coin handling machine according to the third aspect may be any machine handling coins. One such kind of coin handling machine is a coin sorting machine. Such machines usually allow a user to input a mass of coins into the machine, whereby the machine sorts the coins into different coin groups, defined e.g. by different denomination. The coin handling machine may, alternatively, be a coin depositing and dispensing machine. Such machines are typically larger ATM-type of machines provided at banks or large financial institutions. Such coin handling machines allow users to deposit coins into the machine, whereby the corresponding sum of money will be deposited into a bank account of the customer's.

Effects and features of the second and third aspects are largely analogous to those described above in connection with the first aspect. Embodiments mentioned in relation to the first aspect are largely compatible with the second aspect and third aspects. It is further noted that the inventive concepts relate to all possible combinations of features unless explicitly stated otherwise.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The invention will by way of example be described in more detail with reference to the appended drawings, which shows presently preferred embodiments of the invention.

Figure 1A:
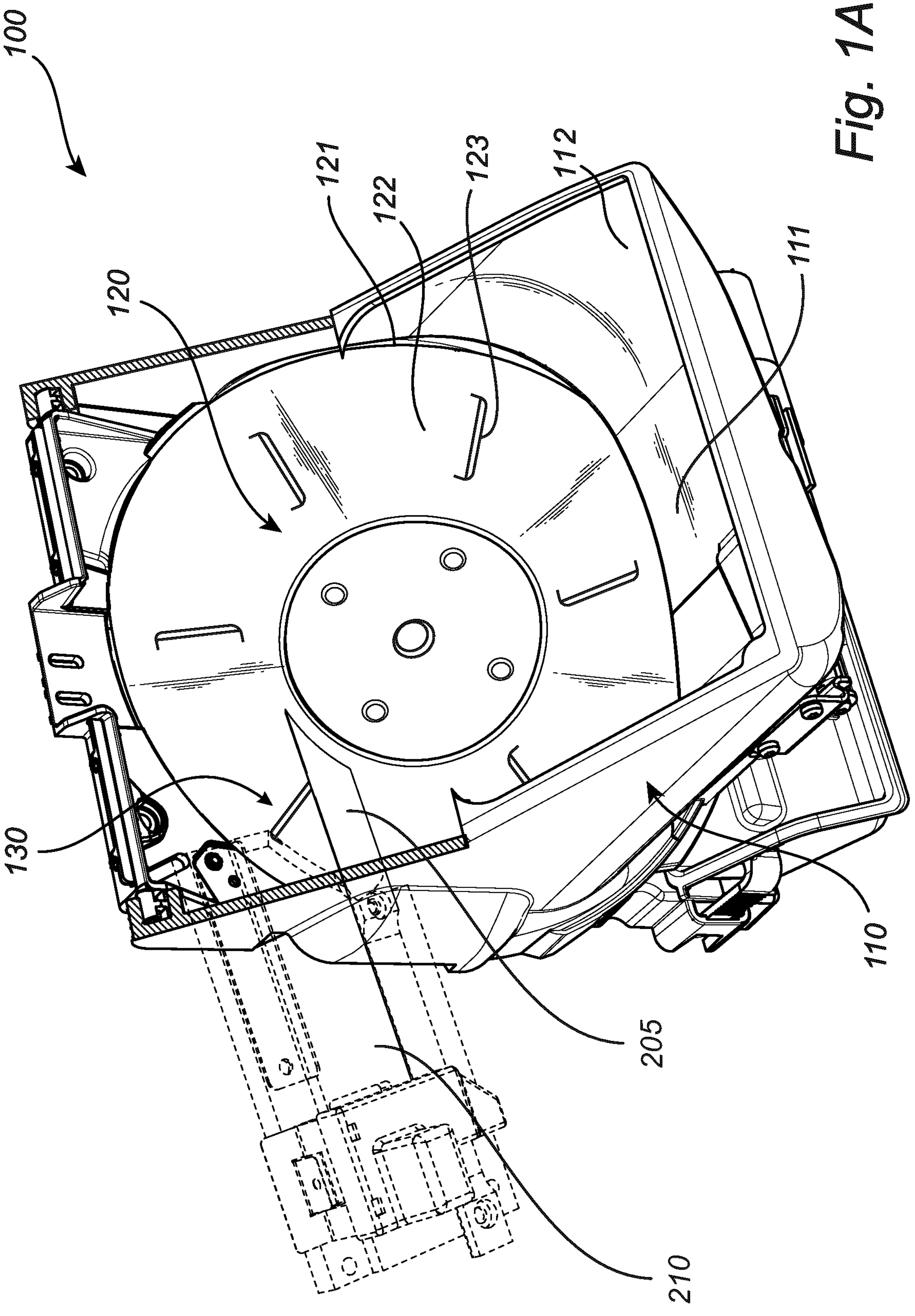
FIG. 1A to 1B show an upper perspective view and a front perspective view of the coin feeding unit according to an embodiment of the present disclosure.

FIG. 3A to 3D schematically illustrate four steps in the sequence of closing the discharge gate and how the lock function may work, according to the embodiment of FIGS. 1A and B.

Figure 4A:
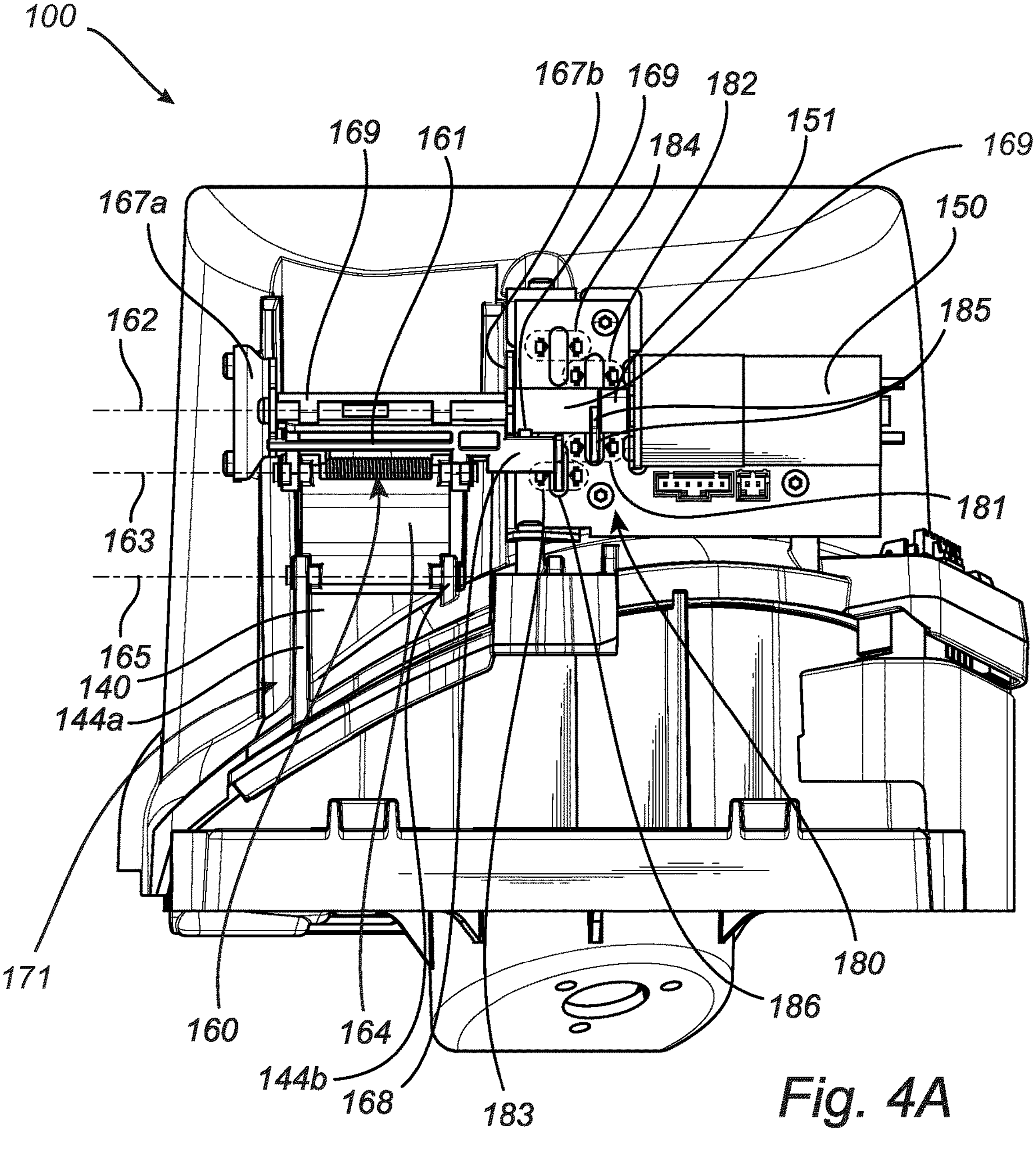
Figure 4B:
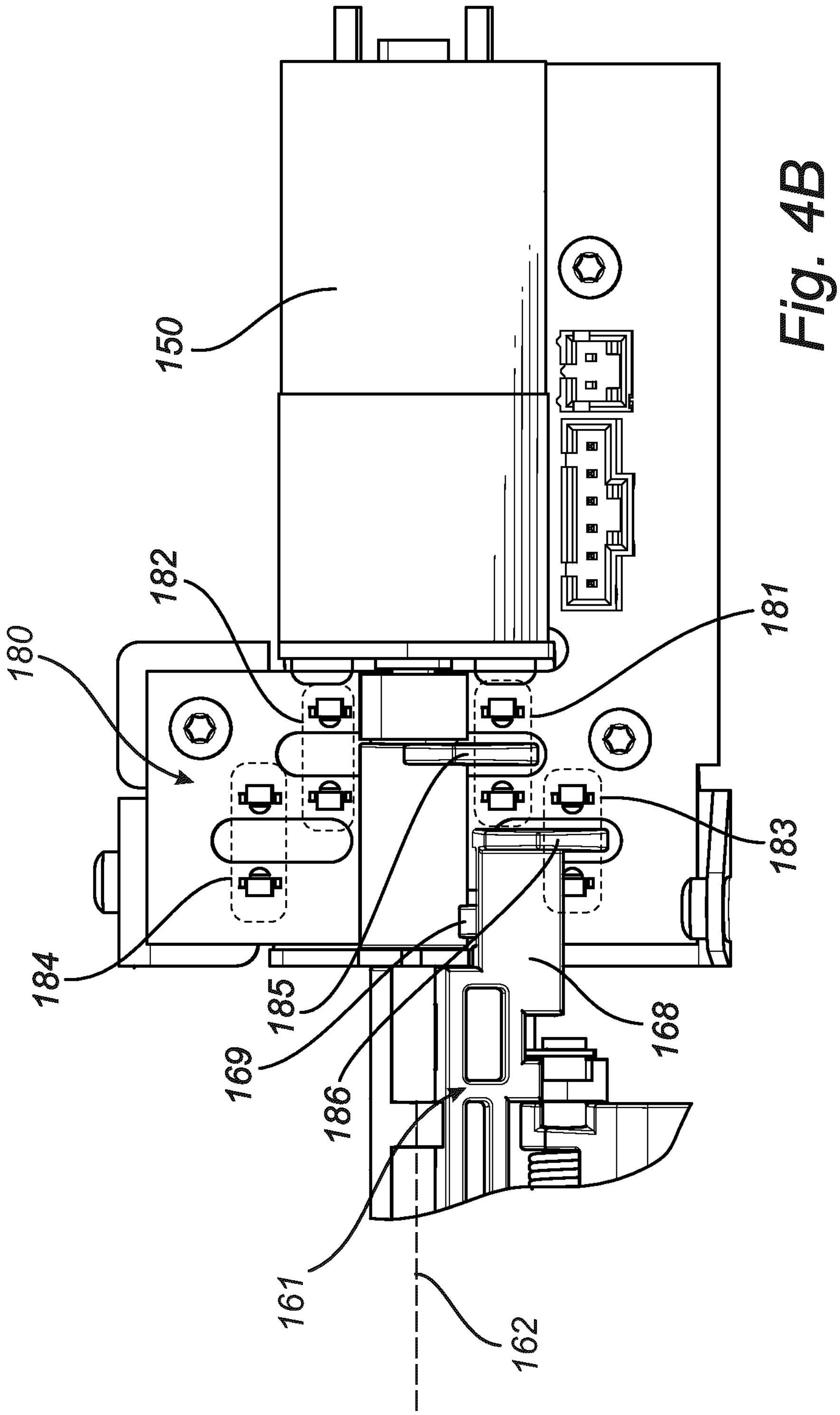

FIGS. 4A and 4B show a bottom view of the coin feeding unit, the transmission mechanism, the electric motor, and a sensor system, according to the embodiment of FIGS. 1A and B.

Figure 5A:
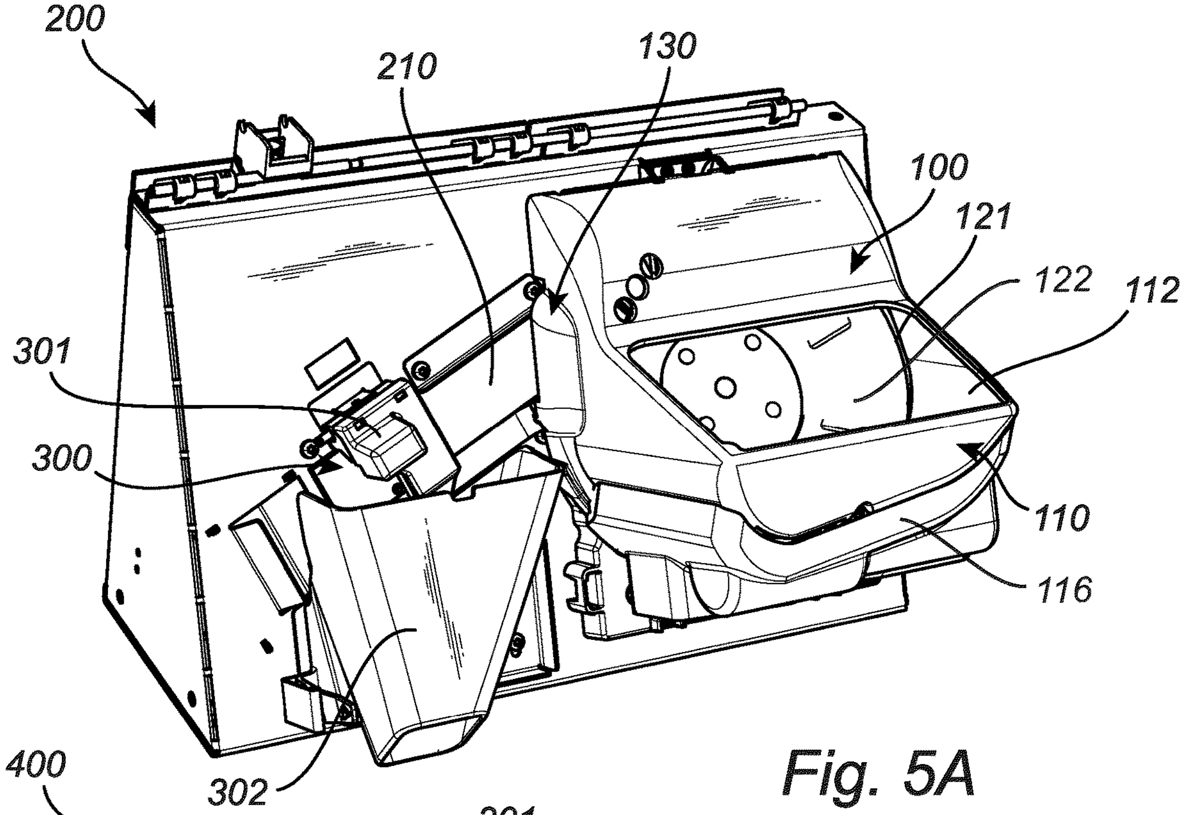

FIG. 5A shows a coin handling module, comprising a coin feeding unit, a transport rail, and a discrimination unit, according to an embodiment of the present disclosure.

Figure 5B:
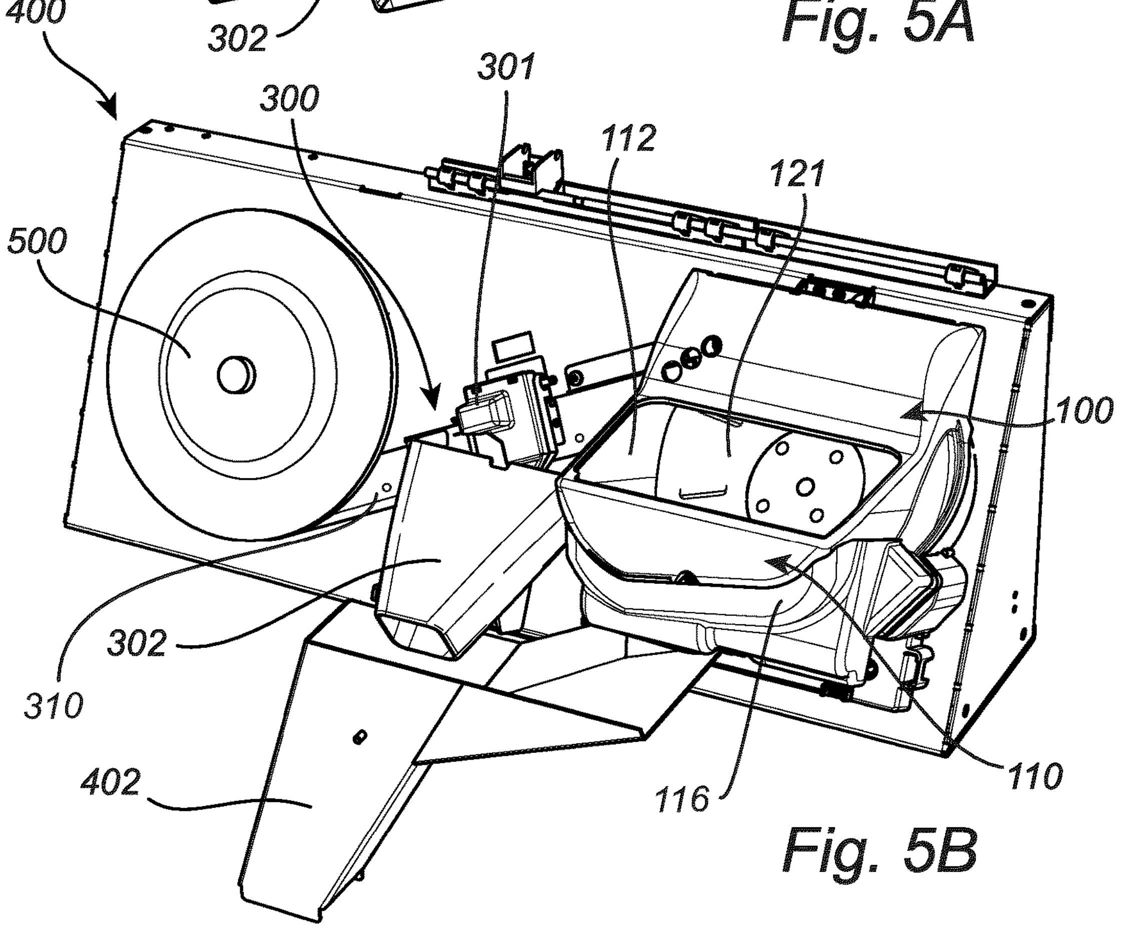

FIG. 5B shows a coin handling module, comprising a coin feeding unit, a transport rail, a discrimination unit, and a coin sorting unit, according to an alternative embodiment of the present disclosure.

Figure 6:
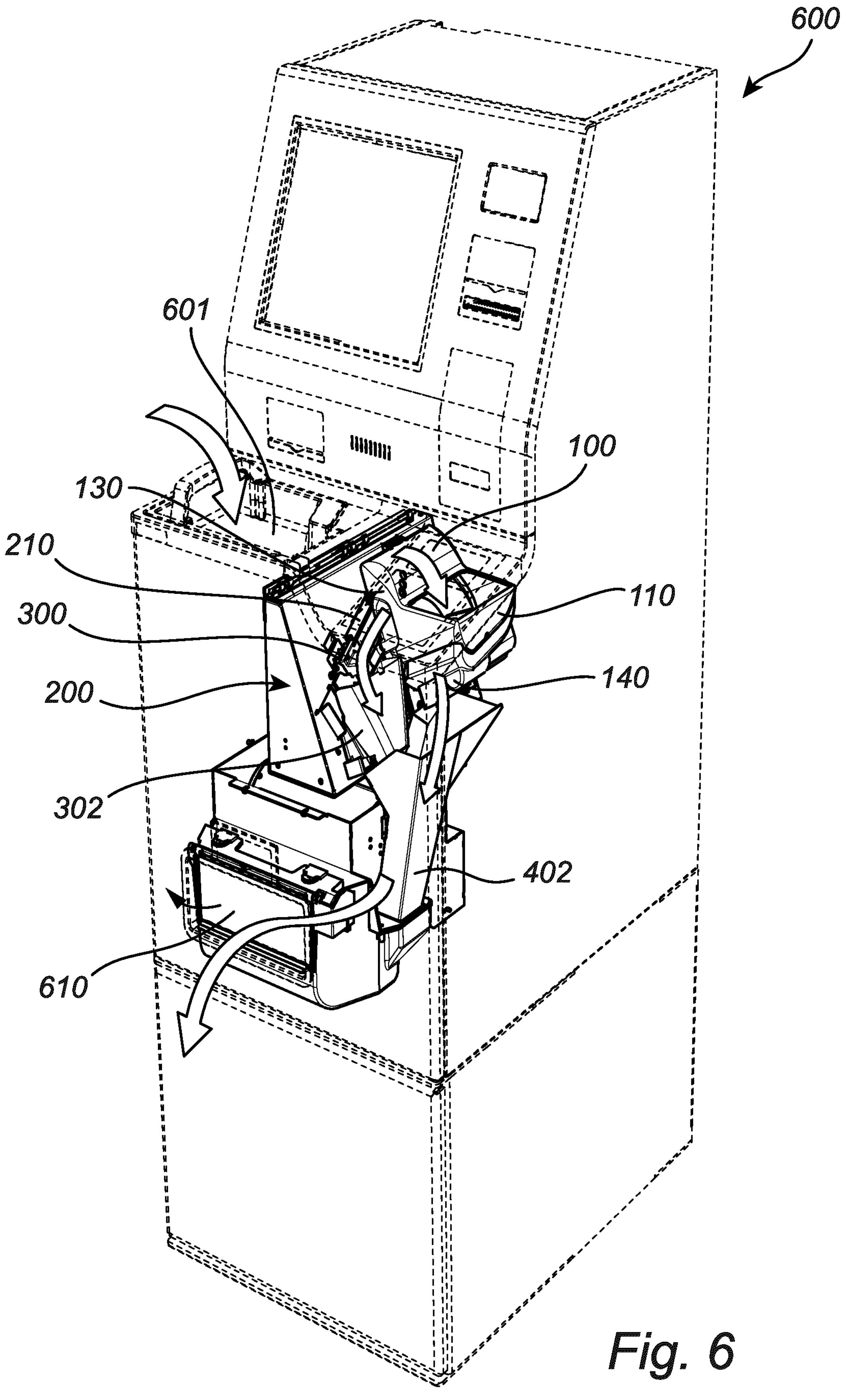

FIG. 6 shows a coin handling machine comprising a coin feeding unit, a transport rail, and a discrimination unit, according to an embodiment of the disclosure.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

FIG. 1A illustrates an upper perspective view of a coin feeding unit 100 according to an example embodiment. The coin feeding unit 100 is suitable for feeding a mass of coins received thereto in a disarray fashion, one by one, so as to form an array of coins, to an output position 130. At the coin output position 130, the coins are guided away from the coin feeding unit 100 by means of a separating knife 205. Typically, the coin feeding unit 100 is part of a coin handling machine. Such machines are discussed more in detail later.

The coin feeding unit 100 is equipped with a coin guiding arrangement 110 comprising a coin hopper 112 for receiving a mass of coins. It is understood that, for the present example embodiment, the coin hopper 112 defines the coin guiding arrangement 110. Thus, from hereon, the term "coin hopper 112" will be used when referring to the coin guiding arrangement 110. A coin transport arrangement 120 is provided on a rear side of the coin hopper 112 and connects thereto. In the disclosed embodiment the coin transport arrangement 120 comprises a rotatable disc 121 arranged to rotate around its central axis while the coin feeding unit 100 is in use. The surface of the rotatable disc 121 facing inwards in the coin hopper 112 defines a movable transport surface 122. The movable transport surface 122 is provided with a number of pickup members 123, in order for the rotatable disc 121 to be able to pick up coins. In the present embodiment, the movable transport surface 122 is an inclined surface. The movable transport surface 122 together with a portion of the inner surfaces of the coin hopper 112 walls, defines a bowl in which the received mass of coins is held. The bottom surface of the coin hopper 112, where the received coins arrive and encounter the movable transport surface 122, is here referred to as the coin arrival surface 111. While the coin feeding unit 100 is in use, the rotatable disc 120 rotates such that the pickup members 123 pickup coins, one by one, from the disarray of coins at the coin arrival surface 111. Due to the inclined angle of the transport surface 122, the picked up coins remain on the surface by assistance of gravity, as opposed to a vertical surface from which the coins are likely to fall off. The transport surface 122 transport the coins up to a coin output position 130, where the coins, one by one, disengage the transport surface 122. Here, the coins are fed, one by one, as a singular line of coins through the output position 130 of the coin feeding unit 100. The coins are disengaged by engaging a coin separating knife 205, which deflect the coins from the transport surface 122. The deflected coins may then travel along a transport rail 210 to other parts of the coin handling machine.

Figure 1B:
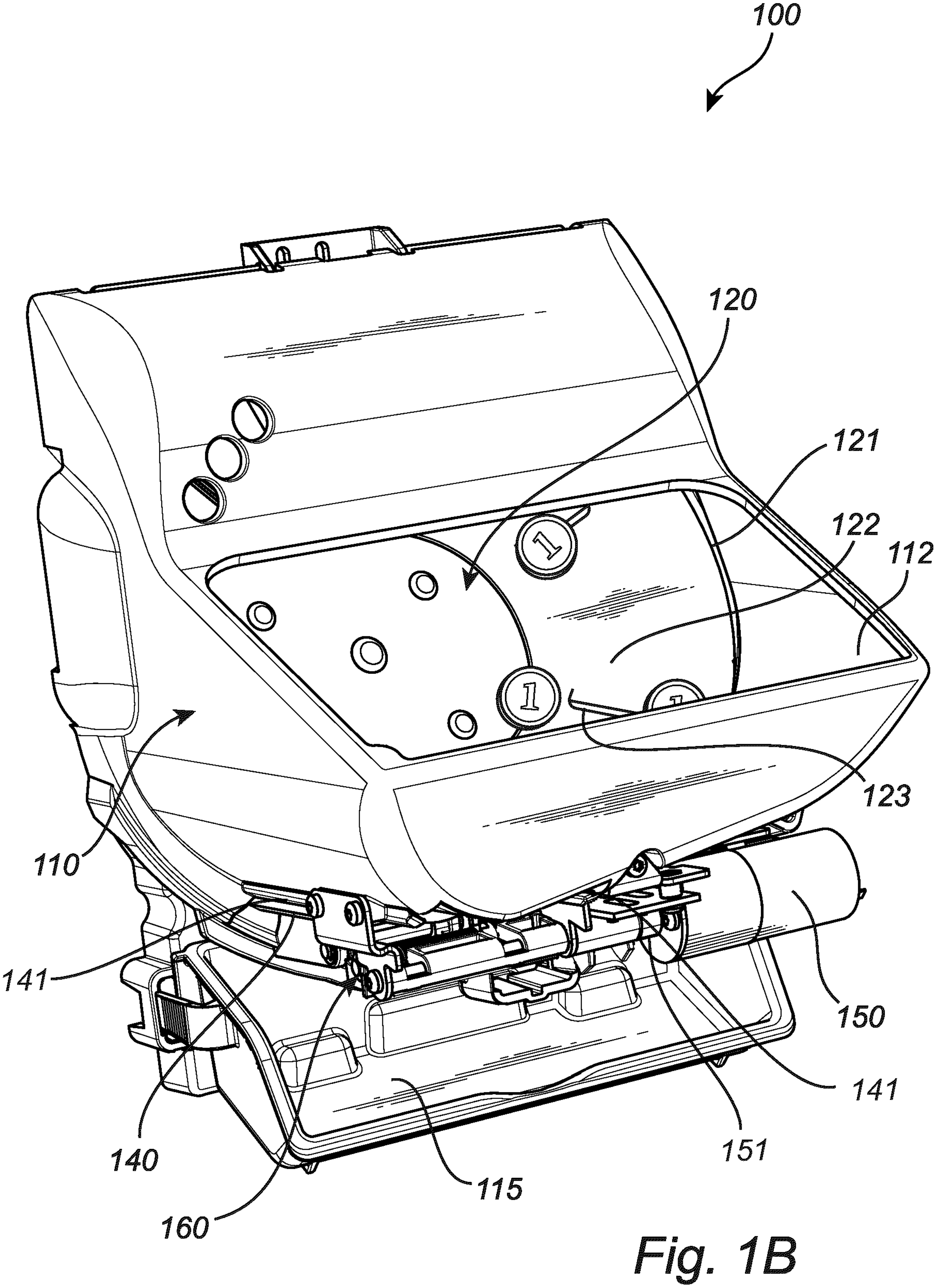

FIG. 1B illustrates a front perspective view of the coin feeding unit 100 shown in FIG. 1A. As illustrated in FIG. 1B, but also in FIGS. 2A and B, the coin hopper 112 is provided with a discharge gate 140 at a bottom surface 114 of the coin hopper 112. The discharge gate 140 is mechanically connected to a transmission mechanism 160. The coin hopper 112 is also provided with a drive unit in the form of an electric motor 150, on the bottom surface 114 of the coin hopper 112. The electric motor 150 comprises a rotational drive shaft 151 that extends outwards from a side of the electric motor 150. In the present embodiment, the rotational drive shaft 151 is in mechanical contact with the transmission mechanism 160, although not fixedly connected to it. When the electric motor 150 is activated, the rotational drive shaft 151 starts to rotate and the torque from the rotational drive shaft 151 is transferred via the transmission mechanism 160 to the discharge gate 140. The discharge gate 140 is slidably arranged in the coin hopper 112 in a pair of opposed elongated grooves 141. The discharge gate 140 will, as a result from the torque transferred thereto, start sliding along the bottom surface 114 of the coin hopper 112, guided by the elongated grooves 141, so as to expose an associated through-opening 113 provided in the coin hopper 112. Thus the discharge gate 140 is opened.

The purpose of opening the discharge gate 140 in the coin hopper 112 is to empty the coin hopper 112 from any unwanted objects. Such unwanted objects may be, for example stones, rings, buttons, etc. which, often accidentally, was input to the coin feeding unit together with the coins. Whereas the coins are shaped so as to be transportable by the coin transport unit 120, the unwanted objects cannot be collected to be transported by the coin transport unit 120 due to their unsuitable shape. By means of the discharge gate 140, unwanted objects residing in the coin hopper 112 may fall out upon opening of the discharge gate 140. In the disclosed embodiment, such unwanted object may fall into a collection tray 115 arranged underneath the opening in the coin hopper 112. However, other solutions so as to how the unwanted objects are collected may occur in alternative embodiments. By way of example, the unwanted objects may fall into a funnel or in an inclining tray, leading the unwanted objects elsewhere.

Figure 2A:
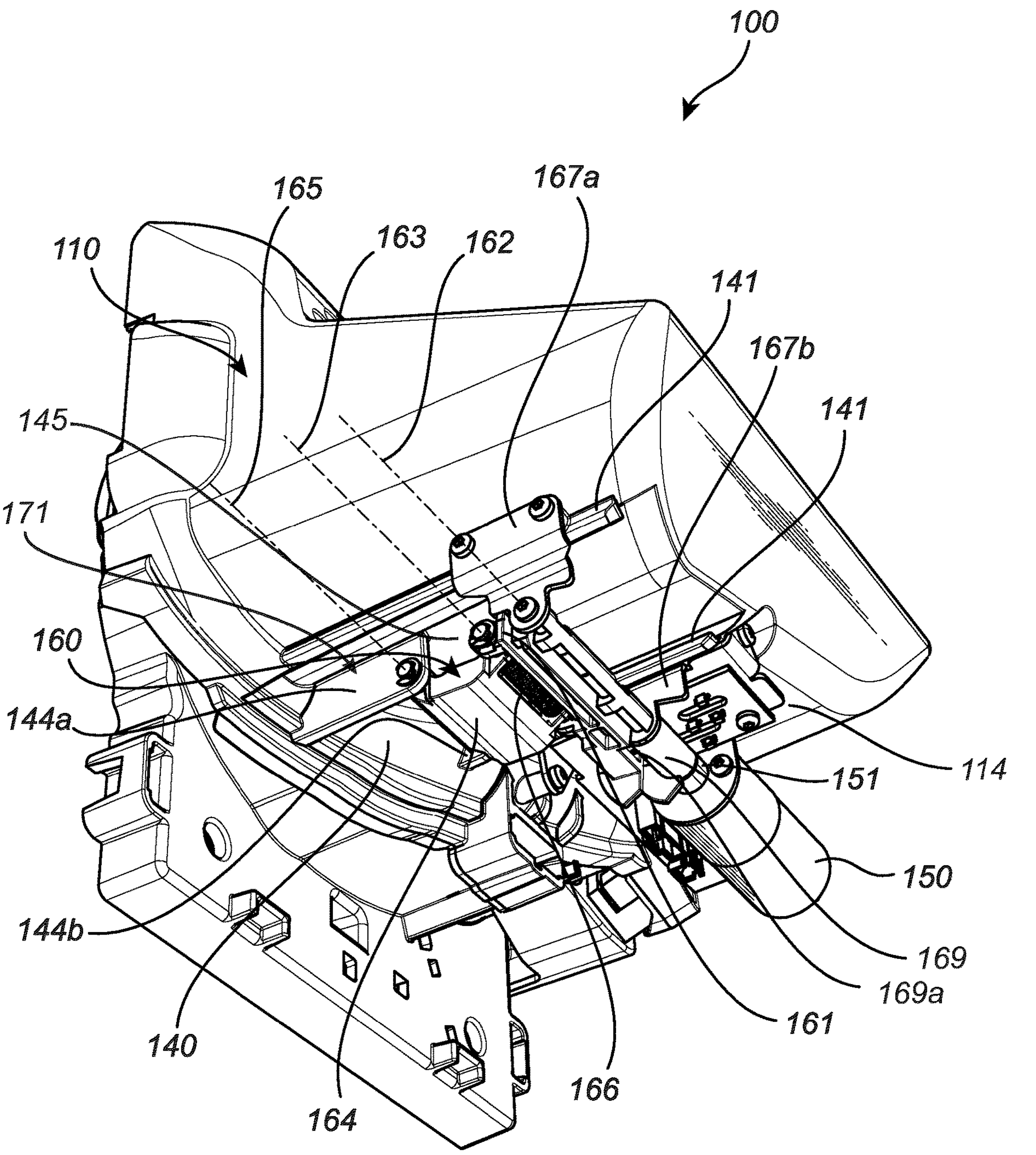
FIG. 2A to 2B show a bottom view of the coin feeding unit, with the discharge gate in the closed and open positions, according to the embodiment of FIGS. 1A and B.

FIG. 2A illustrates the coin feeding unit 100 viewed from below when the discharge gate 140 is in a closed position 171 (see also FIG. 3D). FIG. 2A shows in more detail how the discharge gate 140, the transmission mechanism 160, and the electric motor 150 are interconnected.

According to the disclosed embodiment, the drive unit in the form of the electric motor 150 is arranged on a side of a bottom surface 114 of the coin hopper 112. The rotational drive shaft 151 extends out from a side of the electric motor 150 and a rotational centre axis in alignment with a first pivot axis 162 of the transmission mechanism 160. An engagement element 169 is attached to the rotational drive shaft 151. The engagement element 169 rotates along with the rotational drive shaft 151 about the first pivot axis 162. The engagement element 169 has an engaging portion 169*a* extending transverse out from the rotational axis of the rotational drive shaft 151, such that when the rotational drive shaft 151 rotates, the engaging portion 169*a* swings around the rotational drive shaft 151.

A first element 161 of the transmission mechanism 160 extends between two brackets 167*a* and 167*b*, and is pivotally connected thereto so as to be rotatable around the first pivot axis 162. The first element 161 of the transmission mechanism 160 is, however, not attached to the rotational drive shaft 151 of the electric motor 150. Instead, the first element 161 is arranged to swing around the first pivot axis 162 in response to being supplied with kinetic energy from the electric motor 150 by means of the engaging portion 169*a* of the engagement element 169 (not shown in FIG. 2A), as will be discussed in more detail later.

The first element 161 extends radially in one direction from the first pivot axis 162, and at a radial distance from the first pivot axis 162, the first element 161 presents a second pivot axis 163. The second pivot axis 163 is parallel to the first pivot axis 162. At the second pivot axis 163, the second element 164 of the transmission mechanism 160 is pivotally connected to the first element 161.

On a bottom side 145 of the discharge gate 140, two protrusions 144*a* and 144*b* project outwards at opposed lateral ends of the discharge gate 140. In the two protrusions 144*a-b*, the discharge gate 140 is pivotally connected to the second element 164 of the transmission mechanism 160, at a third pivot axis 165.

Around the second pivot axis 163 a spring 166 is arranged such that the second pivot axis 163 is pushed upwards towards the bottom surface 114 of the coin hopper 114. Alternatively, for other example embodiments, the second pivot axis 163 may be pushed upwards towards the bottom side 145 of the discharge gate 140 instead, depending on the length of the discharge gate 140 in relation to the length of the transmission mechanism 160. In either case, if the electric motor 150 is not activated to open the discharge gate 140, the spring 166 will ensure to keep the discharge gate 140 in the closed position 171, as shown in FIG. 2A. An advantage of biasing the transmission mechanism 160 by means of the spring 166 is that the electric motor 150 may return the engagement element 169 to a rest position, whereby the transmission mechanism 160 will be allowed to move, as a result from the biasing, towards the closed position 171. Should a jam occur, the discharge gate 140 and the transmission mechanism 160 would be forced to stop somewhere in between the open position 172 and the closed position 171. As the engagement element 169 and the first element 161 is not attached to each other, the occurrence of this unexpected stop in between the positions 172,171 will not affect the electric motor 150.

Figure 2B:
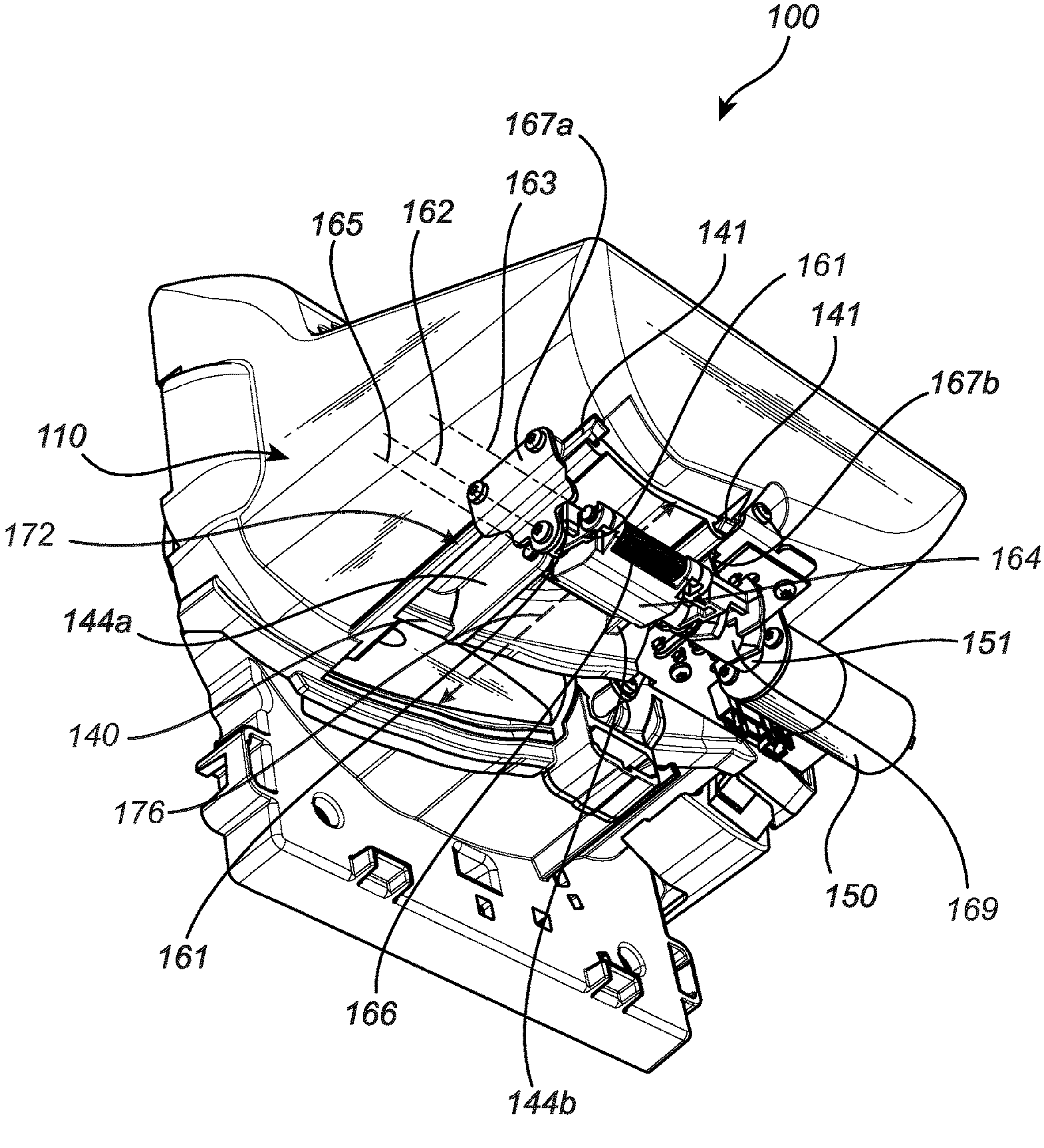

FIG. 2B illustrates the coin feeding unit 100 viewed from below when the discharge gate 140 is in an open position 172 (see also FIG. 3A). When being in the open position 172, the electric motor 150 supplies a torque, by means of the engagement element 169 to balance the biasing force of the spring 166. When the discharge gate 140 is to be closed, the electric motor 150 is instructed to rotate the engagement element 169 in a clockwise direction as seen from the current viewing angle in FIG. 2B. The first element 161 will swing around the first pivot axis 162. The second pivot axis 163 will swing along with it, and thus be moved to the opposite side of the first pivot axis 162. Consequently, the second element 164 will be pushed by first element 161. The second element 164 will in turn move the third pivot axis 165 along with it, whereby the discharge gate 140 will be slidably pulled to the open position along a displacement path 176 defined by the elongated grooves 141.

FIG. 3A-D schematically illustrate four steps in the sequence of closing the discharge gate 140, and how the lock function may work, according to the example embodiment of FIGS. 2A and B.

Figure 3A:
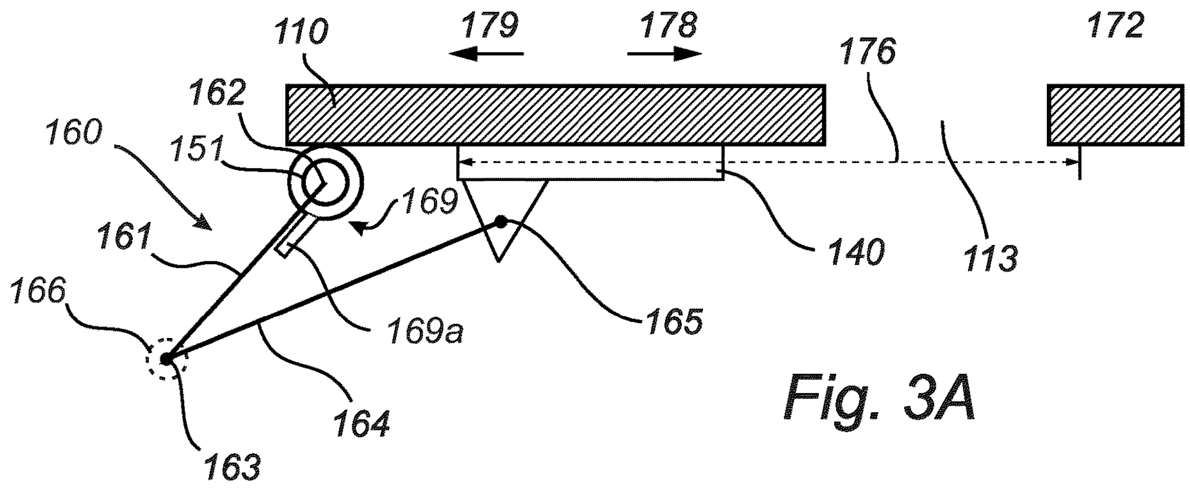

FIG. 3A schematically illustrates the discharge gate 140 and the elements of the transmission mechanism 160 when the discharge gate 140 is in the open position 172. When the discharge gate 140 is in the open position 172, the through-opening 113 in the coin hopper 112 is uncovered. The electric motor 150 is actively supplying kinetic energy to the transmission mechanism 160 in order to counteract the torque from the spring 166. This is achieved by the engaging portion 169*a* of the engagement element 169, which actively forces the first element 161 to stay in the open position 172.

Figure 3B:
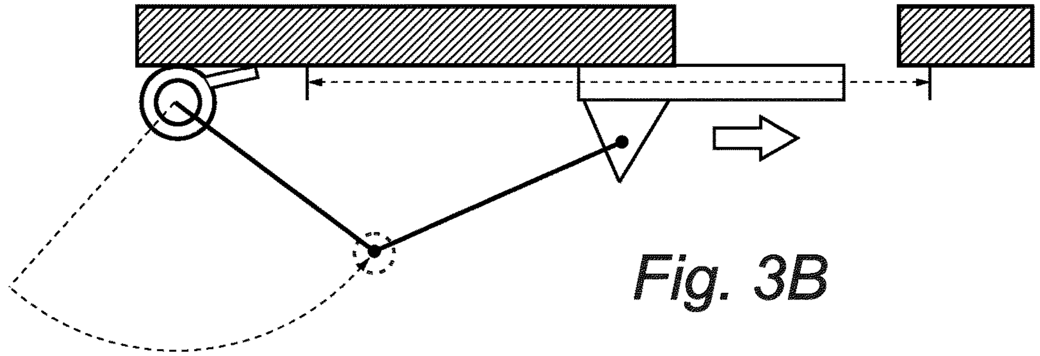

FIG. 3B illustrates the discharge gate 140 and the elements in the transmission mechanism 160 when the discharge gate 140 has started to close. The electric motor 150 has started to turn the rotational drive shaft 151, and thus the engaging portion 169*a* of the engagement element 169 attached thereto, releasing the torque supplied to the first element 161. In the present embodiment, the electric motor 150 does not provide force on the transmission mechanism 160 to move the discharge gate 140 in the closing direction 178. As illustrated in FIG. 3B as an example, the rotational drive shaft 151 can quickly turn all the way back, and thus quickly move the engaging portion 169*a* to the opposite side of the drive shaft 151, whereas the spring-loaded transmission mechanism 160 may return in its own pace, possibly slower than for the drive shaft 151. The force on the transmission mechanism 160 to move the discharge gate 140 in the closing direction 178 is instead achieved by the spring 166 at the second pivot axis 163. The spring 166 exerts torque at the second pivot axis 163 so as to increase the angle defined between the first element 161 and the second element 164. During this closing procedure, the first element 161 and the second element 164 are in motion such that the second pivot axis 163, at which the two elements are connected, is displaced in a circular motion around the first pivot axis 162. As a result, the discharge gate 140 starts sliding along the displacement path 176 in the closing direction 178.

Figure 3C:
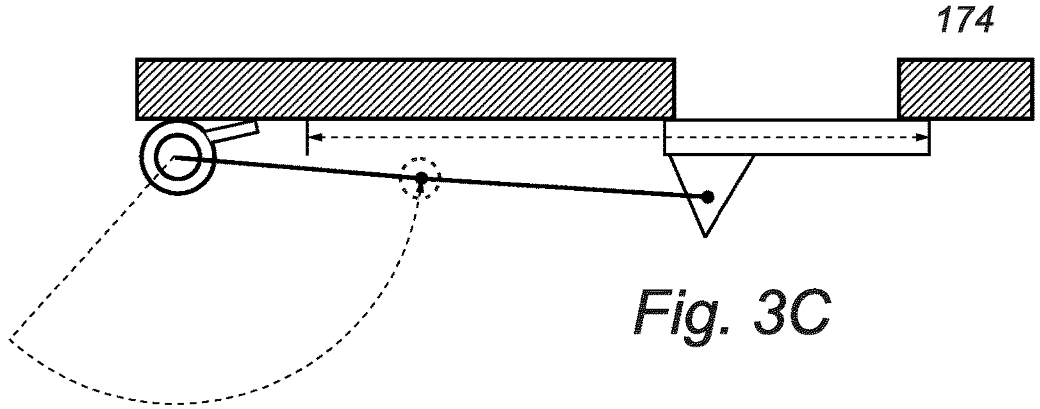

FIG. 3C illustrates the discharge gate 140 and the elements in the transmission mechanism 160 when the discharge gate 140 has reached the maximum displacement position 174. When the discharge gate 140 is closing, it moves in the closing direction 178 away from the open position 172. When the first element 161 and the second element 164 form a straight line, i.e. when the transmission mechanism 160 is fully extended, the discharge gate 140 reaches the maximum displacement position 174.

Figure 3D:
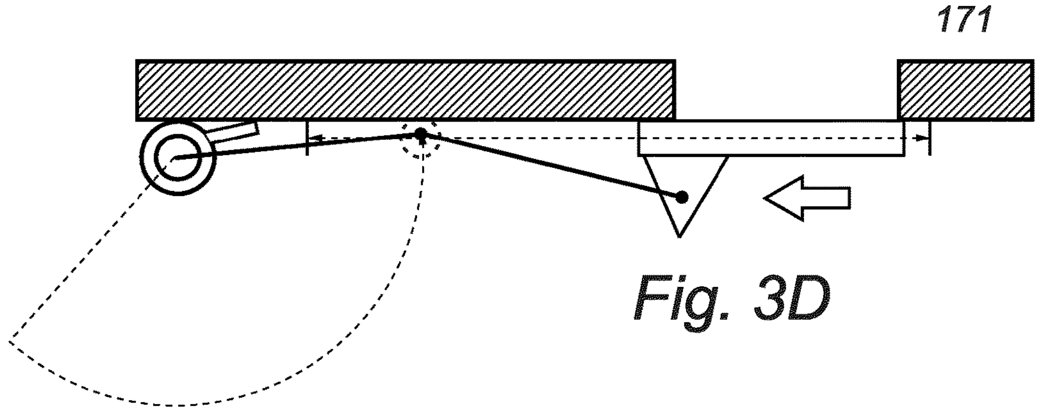

FIG. 3D illustrates the discharge gate 140 and the elements in the transmission mechanism 160 when the discharge gate 140 has reached the closed position 171. Subsequent to the discharge gate 140 reaching the maximum displacement position 174, the second pivot axis 163 continues its circular motion around the first pivot axis 162. Consequently, the discharge gate 140 starts to move in the opposite direction, i.e. in the opening direction 179. The motion continues until either the first element 161 or the second element 164 around the second pivot axis 163, meets a part of the coin feeding unit 100, such as e.g. the bottom surface 114 of the coin hopper 112 or the brackets 167*a*, 167*b*, and can no longer continue. The motion is stopped and the discharge gate 140 has reached the closed position 171. From FIG. 3D it is clear that, if a force were applied on the discharge door 140 in the closed position 171, attempting to push it in the opening direction 179, the first element 161 and second element 164 will be pushed towards the bottom surface 114 of the coin hopper 112, resulting in a counter force preventing the discharge gate 140 from opening. This essentially provides a lock function for the discharge gate 140.

FIG. 4A illustrates a bottom view of a coin feeding unit 100 showing the transmission mechanism 160, the electric motor 150, and a sensor system 180, according to an embodiment of the invention. The first element 161 and the second element 164 are shown, as well as how they are interconnected at the second pivot axis 163, and how they connect to the rotational drive shaft 151 at the first pivot axis 162 and to the discharge gate 140 at the third pivot axis 165, respectively. As previously mentioned, the first element 161 is freely pivotable around the rotational drive shaft 151. From one of the lateral sides of the first element 161, a receiving portion 168 extends towards the electrical motor 150. When the discharge gate 140 is in the closed position, the receiving portion 168 covers the engaging portion 169*a* of the engagement element 169, which is attached to the rotational drive shaft 151. As the rotational drive shaft 151 starts turning, the engaging portion 169*a* will engage the receiving portion 168 of the first element 161, and thereby push the first element 161 along with it in the rotational motion of the rotational drive shaft 151. When returning from the open position 172 to the closed position 171, the engaging portion 169*a* and the rotational drive shaft 151 of the electric motor 150 turns in the opposite direction. Neither the engagement element 169 nor the rotational drive shaft 151 pulls the transmission mechanism 160 to return the discharge gate to the closed position. As previously mentioned, this is accomplished by the spring 166 exerting torque around the second pivot axis 163 on the first element 161 and the second element 164. By the present arrangement, should the discharge gate 140 be jammed for example by foreign object or coins, such that the discharge gate 140 and the transmission mechanism 160 are prevented from returning to the closed position 171, the electric motor 150 is still able to freely return to its rest position. This will avoid causing unnecessary stress to the electric motor 150 that could otherwise cause damages to the electric motor 150.

As shown in FIG. 4B, the coin feeding unit 100 further comprises a sensor system 180 for detecting gate jam. The positions of the engagement element 169 and the first element 161 can be determined individually by the sensor system 180, and based on the result a control unit (not shown) may determine whether the discharge gate 140 is jammed or not.

In the present example embodiment, the position of the engagement element 169 is determined using two optical sensors; a motor closed sensor 181 and a motor open sensor 182. Each sensor comprises a transmitter and a receiver, between which an optical signal in sent. The sensors of the example are fork sensors. The engagement element 169 comprises a motor sensor blocking element 185 which extends radially out from the drive shaft 151, said motor sensor blocking element 185 being arranged to block an optical signal transmitted from the transmitter to the receiver of either the motor closed sensor 181, or the motor open sensor 182. Thus, the control unit may know if the engaging portion 169*a* of the engagement element 169 is in the closed or open position, based on whether the motor closed sensor 181 or the motor open sensor 182 is blocked.

Further, the position of the first element 161 is determined using another two optical sensors; a gate closed sensor 183 and a gate open sensor 184. The first element 161 comprises a gate sensor blocking element 186 extending out from the receiving portion 168 traverse to the first pivot axis 162. The gate sensor blocking element 186 is arranged to block the signal transmitted the transmitter and receiver of either the gate closed sensor 183 or the gate open sensor 184 depending other whether the discharge gate 140 is open or closed. The gate closed sensor 183 will detect that the transmitted signal is blocked when the discharge gate 140 is in the closed position 171, and the gate open sensor 184 will detect that the transmitted signal is blocked when the discharge gate 140 is in the open position 172.

If the electric motor 150 returns to the closed position 171, the motor sensor blocking element 185 will be detected by motor closed sensor 181. If, at the same time, the gate sensor blocking element 186 is detected by gate closed sensor 183, the discharge gate 140 is considered closed. If, however, the discharge gate 140 is prevented from closing, e.g. by a jam from foreign objects and/or coins, the gate sensor blocking element 185 may not be detected by the gate closed sensor 183. In such a case, the control unit will conclude that the discharge gate 140 is jammed, and may initiate for example an opening of the discharge gate 140 using the electric motor 150 in attempt to remove the jammed object from the discharge gate 140.

FIG. 5A discloses a coin handling module 200 according to an example embodiment. The present embodiment is a coin handling module 200 in the form of a coin acceptance module, CAM, comprising a coin feeding unit 100 according to what has been previously described, a transport rail 210, and a discrimination unit 300. The coin handling module 200 is configured to be operated independently within a coin handling machine, potentially aided by control means of said machine. Thus, the coin handling module 200 may be removed, or replaced, for example when servicing the machine. Coins received in the coin guiding arrangement 110 (in the example: the coin hopper 112), are picked up by the rotatable disc 121, one by one, and transported to the coin output position 130 of the coin feeding unit 100. At the output position 130 the coins disengage the movable transport surface 122 of the rotatable disc 121, after which the coins may travel as a singular line of coins along a transport rail 210 out of the coin feeding unit 100. The transport rail 210 may guide the coins to the discrimination unit 300. The discrimination unit 300 comprises a discrimination sensor 301 configured to determine if a coin which is transported thereto from the coin feeding unit 100 is an acceptable coin or a coin to be rejected. Depending on the result of the detection, the coin discriminating unit 300 may guide coins differently. For example, if a coin is determined to be an acceptable coin, it may be allowed to continue traveling along the transport rail 210, whereas if the coin is determined to be an unacceptable coin it is to be rejected, and may therefore be taken off the transport rail 210 and being discharged through a discharge funnel 302. As illustrated in FIG. 5A, the coin handling unit 200 further comprises a cover 116 for covering the discharge gate 140 and the previously discussed mechanical and electrical components associated therewith.

FIG. 5B discloses a coin handling module 400 according to an alternative example embodiment. The present embodiment is a coin handling module 400 in the form of a coin acceptance module, CAM, comprising a coin feeding unit 100 according to what has been previously described, a transport rail 210, a discrimination unit 300, and a coin sorting unit 500. The part previously described in FIG. 5A may function in the same manner also for the embodiment disclosed in FIG. 5B. The addition of a coin sorting unit 500, allows the coin handling module 400 to sort coins determined by the discrimination unit 300 to be acceptable, into different denominations.

If the coin is determined to be an unacceptable coin, it may be taken off the transport rail 210 and being discharged through a discharge funnel 302. Some embodiments may comprise a collection tray, collecting coins discharged by the discrimination unit 300 through the discharge funnel 302. The collection tray may be a part of the coin feeding unit 100. In such a case, the collection tray for discharged coins may be the same as the collection tray 115 for collecting discharged unwanted objects, or it may be a separate collection tray. The collection tray may alternatively be a part of a coin handling module.

As illustrated in FIG. 5B, some embodiments may comprise a receiving guide conduit 402, arranged to receive discharged coins from the discrimination unit 300 through the discharge funnel 302, guiding the coins to another part of the machine in which the coin handling module is installed, or to an output of the machine. The receiving guide conduit 402 may be arranged to also receive unwanted objects being discharged from the coin guiding arrangement 110 when the discharge gate 140 is opened.

Accepted coins may continue through the discrimination unit 300 and travel down to the coin sorting unit 500. Although not illustrated in FIG. 5B the coin sorting unit typically comprises a carrier disc which transports valid coins along a circular sorting path across a series of openings in the front plate. The openings are of increasing size, such that coins of the smallest diameter will fall through the first opening, whereas coins of the second smallest opening are separated through the next opening, etc. By the present arrangement, the coins are sorted by size in the coin handling module 400.

FIG. 6 discloses an embodiment of a coin handling machine 600 according to the third aspect of the invention. The coin handling machine 600 in the example is a coin depositing and dispensing machine typically located in banks and large financial institutions. It allows customers, such a store owners and merchants, to deposit a mass of coins into the machine. The mass of coins will then be counted, analysed and, if deemed accepted by the machine, the amount corresponding to the coins will be deposited on a bank account of the customer. The coin handling machine 600 also allows for dispensing coins, which will mean withdrawal of the corresponding amount from the bank account of the customer.

The coin handling machine 600 is provided here by way of example only. Thus, although not illustrated here, it is conceivable that coin handling machines of the disclosure are different from the coin handling machine 600. For example, the coin handling machine may only be a coin depositing machine. Such machines generally do not allow dispensing of coins, unless they are found to be not acceptable by the machine. Coin handling machines of the disclosure may alternatively perform other tasks, such as coin counting, coin sorting or the like.

The coin handling machine 600 comprises a coin deposit position 601 at which a user of the coin handling machine 600 can deposit coins. The deposited coins are transported to a coin handling module 200 according to what has been previously described. There are numerous solutions known in the art as to how to transport the coins to the coin handling module 200. Transportation may be achieved passively, such as for example by building the coins in a coin guiding channel, or an active transportation means. Deposited coins first reach a coin feeding unit 100 at which the coins are picked up one by one and transported to an output position 130 of the coin feeding unit 100. From here, the coins may travel as a singular line of coins along the transport rail 210 out of the coin feeding unit 100 to the discrimination unit 300. At the discrimination unit 300, coins determined to be acceptable are guided to a storage (not shown) in the coin handling machine 600. Also here, there are numerous ways known in the art of how to guide, or transport the accepted coins to the storage. Coins determined to be unacceptable, are rejected from the transport rail 210 and discharged through the discharge funnel 302. Discharged coins may be received by the receiving guide conduit 402. The receiving guide conduit 402 may be configured to guide discharged coins to an escrow position 610 of the coin handling machine 600 at which the user may collect them. In the present embodiment, also unwanted objects discharged from the coin hopper 112 though the discharge gate 140 may be received by the receiving guide conduit 402, which then guides the unwanted objects to the same escrow position 610. It is also conceivable that the unwanted object may be guided to a separate collection unit.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims.

The invention claimed is:

1. A coin feeding unit for feeding a mass of coins to a coin output position at which individual coins of said mass of coins exit the coin feeding unit one by one, the coin feeding unit comprising:

a coin guiding arrangement, and a coin transport arrangement defining a movable transport surface, wherein said coin guiding arrangement is configured to receive coins and to guide said received coins, by means of gravity, to an inner coin arrival surface of the coin guiding arrangement, said coin arrival surface connecting to the coin transport arrangement and being structured and arranged such that the coins guided to the coin arrival surface will contact the movable transport surface, the coin arrival surface being a bottom surface of the coin guiding arrangement and having an opening, the opening in the coin arrival surface being separate from the coin output position of the coin feeding unit, wherein the coin transport arrangement is configured to move said coins, on the movable transport surface, from the coin arrival surface to the coin output position of the coin feeding unit for allowing said coins being dispensed from the movable transport surface at the coin output position and output one by one from the coin feeding unit, wherein a discharge gate is provided in the coin guiding arrangement, at the opening in the coin arrival surface, for discharging, from the coin guiding arrangement, unwanted objects residing on the coin arrival surface after the mass of coins have exited the coin feeding unit, the unwanted objects being objects other than coins which cannot be moved by the coin transport arrangement to the coin output position, wherein the discharge gate is slidably arranged in the coin guiding arrangement so as to be slidably displaceable, between (i) a closed position in which the discharge gate covers the opening in the coin arrival surface and (ii) an open position in which the discharge gate uncovers the opening in the coin arrival surface for allowing the unwanted objects to fall from the coin guiding arrangement through the opening in the coin arrival surface, by means of gravity, and thereby be discharged from the coin guiding arrangement;

the coin feeding unit further comprising:

a drive unit configured to provide kinetic energy for displacing the discharge gate between the closed position and the open position; and a transmission mechanism configured to transfer the kinetic energy from the drive unit to the discharge gate, wherein the transmission mechanism includes a first element and a second element, the first element arranged to swing around a first pivot axis in response to being supplied with the kinetic energy from the drive unit, the first element presenting a second pivot axis radially distanced from the first pivot axis, and the second element pivotally connecting the first element at the second pivot axis with the discharge gate at a third pivot axis thereof;

wherein the transmission mechanism is configured such that, during a displacement of the discharge gate from the open position to the closed position, the first and second elements are in motion causing the discharge gate to move along a closing direction of a displacement path of the discharge gate until reaching a maximum displacement position being distanced from the closed position in the closing direction and then causing the discharge gate to move along an opening direction of the displacement path until the discharge gate reaches the closed position, wherein movement of the discharge gate during the displacement of the discharge gate from the open position to the closed position stops upon the discharge gate reaching the closed position after having reached the maximum displacement position due to the motion of the first and second elements coming to a physical stop as a result of at least one of the first and second elements adjacent the second pivot axis meeting the coin guiding arrangement.

2. The coin feeding unit according to claim 1, wherein the coin guiding arrangement comprises a coin hopper, and wherein the discharge gate is provided in said coin hopper.

3. The coin feeding unit according to claim 1, wherein the transport surface is an inclined surface.

4. The coin feeding unit according to claim 3, wherein the coin transport arrangement comprises a rotatable disc which defines said movable transport surface.

5. The coin feeding unit according to claim 1, wherein the discharge gate is slidably displaceable between the closed position and the open position along a displacement path defined substantially along the coin arrival surface of the coin guiding arrangement.

6. The coin feeding unit according to claim 5, wherein the discharge gate is slidably arranged in the coin guiding arrangement in a pair of opposed elongated grooves.

7. The coin feeding unit according to claim 1, wherein the drive unit is an electric motor.

8. The coin feeding unit according to claim 7, wherein the first element is engaged by an engagement element which is attached to a rotational drive shaft of the electric motor.

9. The coin feeding unit according to claim 1, wherein the transmission mechanism further includes a spring at the second pivot axis such that the discharge gate is biased towards the closed position.

10. The coin feeding unit according to claim 1, wherein the discharge gate has a lateral extension which is defined transverse to a displacement path of the discharge gate, and wherein the drive unit is configured to provide kinetic energy to the discharge gate by applying a force along the lateral end such that said force is symmetrically distributed along, and covers at least 50% of, the lateral extension.

11. A coin handling module for use in a coin handling machine, said coin handling module comprising:

a coin feeding unit according to claim 1, a coin discriminating unit configured to detect coins received from the coin feeding unit, and, dependent on the result of said detection, output detected coins in one from at least two different output paths, and a coin transport arrangement arranged to receive coins output from the coin feeding unit at the coin output position, and transport said coins to the coin discriminating unit.

12. A coin handing machine comprising a feeding unit according to claim 1.

13. The coin feeding unit according to claim 1, wherein the discharge gate is slidably displaceable between the closed position and the open position along a displacement path extending in a direction other than the direction of gravity.

14. The coin feeding unit according to claim 13, wherein the direction of the displacement path is substantially perpendicular to the direction of gravity.

15. The coin feeding unit according to claim 1, wherein the discharge gate slides in contact with a surface of the coin guiding arrangement as the discharge gate slidably displaces between the closed position and the open position.

* * * * *